United States Patent
Ichikawa et al.

(10) Patent No.: US 11,440,581 B2
(45) Date of Patent: Sep. 13, 2022

(54) ELECTRIC POWER STEERING DEVICE

(71) Applicant: Mitsubishi Electric Corporation, Tokyo (JP)

(72) Inventors: Takanori Ichikawa, Tokyo (JP); Akihiko Mori, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 225 days.

(21) Appl. No.: 16/642,733

(22) PCT Filed: Oct. 16, 2017

(86) PCT No.: PCT/JP2017/037359
§ 371 (c)(1),
(2) Date: Feb. 27, 2020

(87) PCT Pub. No.: WO2019/077647
PCT Pub. Date: Apr. 25, 2019

(65) Prior Publication Data
US 2021/0070349 A1   Mar. 11, 2021

(51) Int. Cl.
*B62D 5/04* (2006.01)
(52) U.S. Cl.
CPC ........... *B62D 5/0406* (2013.01); *B62D 5/046* (2013.01)
(58) Field of Classification Search
CPC .............................. B62D 5/0406; B62D 5/046
See application file for complete search history.

(56) References Cited

U.S. PATENT DOCUMENTS 6,099,325 A   8/2000 Parkhill
6,663,362 B1   12/2003 Lentz et al.
(Continued)

FOREIGN PATENT DOCUMENTS

CN   105932830 A   9/2016
CN   106605336 A   4/2017
(Continued)

OTHER PUBLICATIONS

Extended European Search Report dated Sep. 23, 2020 in European Application No. 17929073.9.
(Continued)

*Primary Examiner* — Tony H Winner
*Assistant Examiner* — Michael R Stabley
(74) *Attorney, Agent, or Firm* — Sughrue Mion, PLLC; Richard C. Turner

(57) ABSTRACT

In an electric power steering device, a control unit includes: a power module including a plurality of switching elements configured to supply current to motor windings of a motor; a control board configured to output a control signal to each of the plurality of switching elements; a housing forming an outer case of the control unit; a power supply connector; and a signal connector. The control board is provided in parallel to the axial direction of the output shaft of the motor, and a projection is formed at a bottom portion on the non-output side of the housing so as to protrude to the non-output side. A non-output side end portion of the control board is inserted into the projection, and the power supply connector and the signal connector are provided in a region other than the projection of an outer wall surface of the bottom portion.

9 Claims, 4 Drawing Sheets

(56) References Cited

U.S. PATENT DOCUMENTS

| | | | |
|---|---|---|---|
| 10,050,493 B2* | 8/2018 | Kabune | B62D 5/0406 |
| 2016/0254732 A1 | 9/2016 | Kojima et al. | |
| 2016/0347354 A1* | 12/2016 | Asao | H02P 25/22 |
| 2017/0015347 A1* | 1/2017 | Asao | B62D 5/046 |
| 2017/0066470 A1* | 3/2017 | Asao | B62D 5/0403 |
| 2017/0158223 A1* | 6/2017 | Abe | H02K 11/33 |
| 2017/0207685 A1 | 7/2017 | Ushio et al. | |
| 2018/0093698 A1* | 4/2018 | Urimoto | B23P 19/02 |

FOREIGN PATENT DOCUMENTS

| | | | |
|---|---|---|---|
| JP | 2003-515059 A | | 4/2003 |
| JP | 2012-110176 A | | 6/2012 |
| JP | 2016-163415 A | | 9/2016 |
| JP | 2017-158390 A | | 9/2017 |
| JP | 2017158390 A | * | 9/2017 |
| WO | 2016/024358 A1 | | 2/2016 |
| WO | 2017/175325 A | | 10/2017 |

OTHER PUBLICATIONS

Communication dated Sep. 9, 2021 from the China National Intellectual Property Administration in y CN Application No. 201780095613. X.
International Search Report for PCT/JP2017/037359 dated Dec. 26, 2017 [PCT/ISA/210].
Written Opinion for PCT/JP2017/037359 dated Dec. 26, 2017 [PCT/ISA/210].

* cited by examiner

ELECTRIC POWER STEERING DEVICE

CROSS REFERENCE TO RELATED APPLICATIONS

This application is a National Stage of International Application No. PCT/JP2017/037359 filed Oct. 16, 2017.

TECHNICAL FIELD

The present invention relates to an electric power steering device including a motor and a control unit integrated with each other, and more particularly, to a structure of the control unit.

BACKGROUND ART

A related-art electric power steering device includes a motor and a control unit aligned with the motor in an axial direction of an output shaft of the motor to be integrated with the motor. The control unit includes a control board and a connector assembly body that has a cylindrical peripheral wall and a bottom portion that closes an opening of the peripheral wall on one side, and in which connectors are assembled to a bottom portion thereof. The connector assembly body is provided on an opposite side to an output side of the output shaft of the motor with an opening of the peripheral wall on another side facing the motor side. The control board is provided perpendicularly to the axial direction of the output shaft of the motor, that is, horizontally in the connector assembly body (see, for example, Patent Literature 1).

A related-art motor unit includes a motor and a module aligned with the motor in an axial direction of an output shaft of the motor to be integrated with the motor. The module includes a control board and a cover that has a cylindrical peripheral wall and a bottom portion that closes an opening of the peripheral wall on one side, and in which connectors are integrally formed at a bottom portion thereof. The cover is provided on an opposite side to an output side of the output shaft of the motor with an opening of the peripheral wall on another side facing the motor side. The control board is provided in parallel to the axial direction of the output shaft of the motor, that is, vertically, in the cover (see, for example, Patent Literature 2).

CITATION LIST

Patent Literature

[PTL 1] WO 2016/024358 A1
[PTL 2] JP 2016-163415 A

SUMMARY OF INVENTION

Technical Problem

In the related-art device disclosed in Patent Literature 1, the control board is provided horizontally in the connector assembly body. With this structure, the control unit can be reduced in size in the axial dimension of the output shaft and thus, the device can be downsized in the axial direction. However, in a case of two-system circuit configuration for redundancy, for example, the number of components to be mounted on the control board is increased. It is accordingly required to increase a size of the control board in a direction orthogonal to the axial direction of the output shaft, that is, in a radial direction. This leads to a problem of an increase in radial size of the device.

In the related-art device disclosed in Patent Literature 2, the control board is provided vertically in the cover. With this structure, the module can be reduced in size in the radial direction, and thus the device can be downsized in the radial direction. However, in a case of two-system circuit configuration for redundancy, for example, the number of components to be mounted on the control board is increased. It is accordingly required to increase a size of the control board in the axial direction of the output shaft while maintaining the radial size of the module. This leads to a problem of an increase in axial size of the device.

The present invention has been made to solve the problems of the related-art devices described above, and has an object to achieve an electric power steering device that can be downsized in a radial direction by providing a control board vertically in a housing, and that can be downsized in an axial direction as well.

Solution to Problems

According to the present invention, there is provided an electric power steering device including: a motor; and a control unit provided on a non-output side in an axial direction of an output shaft of the motor to be integrated with the motor. The control unit includes: a power module including a plurality of switching elements configured to supply current to motor windings of the motor; a control board configured to output a control signal to each of the plurality of switching elements; a heat sink to which the power module is mounted, and which is configured to release heat generated in the plurality of switching elements; a housing forming an outer case of the control unit; a power supply connector; and a signal connector. The control board is provided in parallel to the axial direction of the output shaft, and a projection is formed at a bottom portion on the non-output side of the housing so as to protrude to the non-output side. A non-output side end portion of the control board is inserted into the projection, and the power supply connector and the signal connector are provided in a region other than the projection of an outer wall surface of the bottom portion.

Advantageous Effects of Invention

According to the present invention, the control board is provided in parallel to the axial direction of the output shaft. With this structure, a product can be downsized in the radial direction. The non-output side end portion of the control board is inserted into the projection formed at the bottom portion of the housing. The power supply connector and the signal connector are formed in the region other than the projection of the outer wall surface of the bottom portion. With this structure, the region of the bottom portion in which the power supply connector and the signal connector are provided, can be lowered to the output side by a protruding height of the projection, with the result that the product can be downsized in the axial direction.

DESCRIPTION OF EMBODIMENTS

First Embodiment

Figure 1:
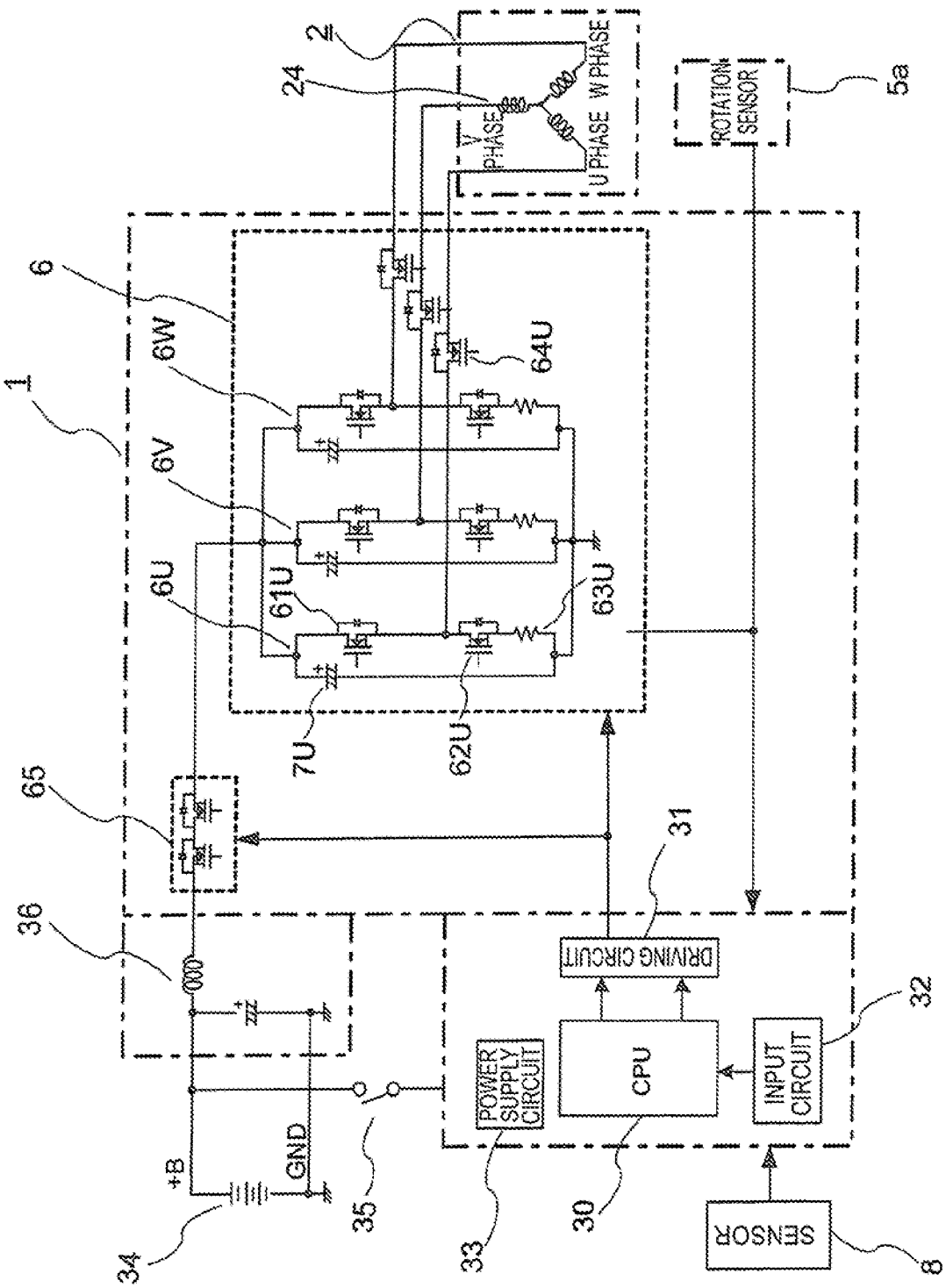
FIG. 1 is a circuit diagram for illustrating an electric power steering device according to a first embodiment of the present invention.
Figure 2:
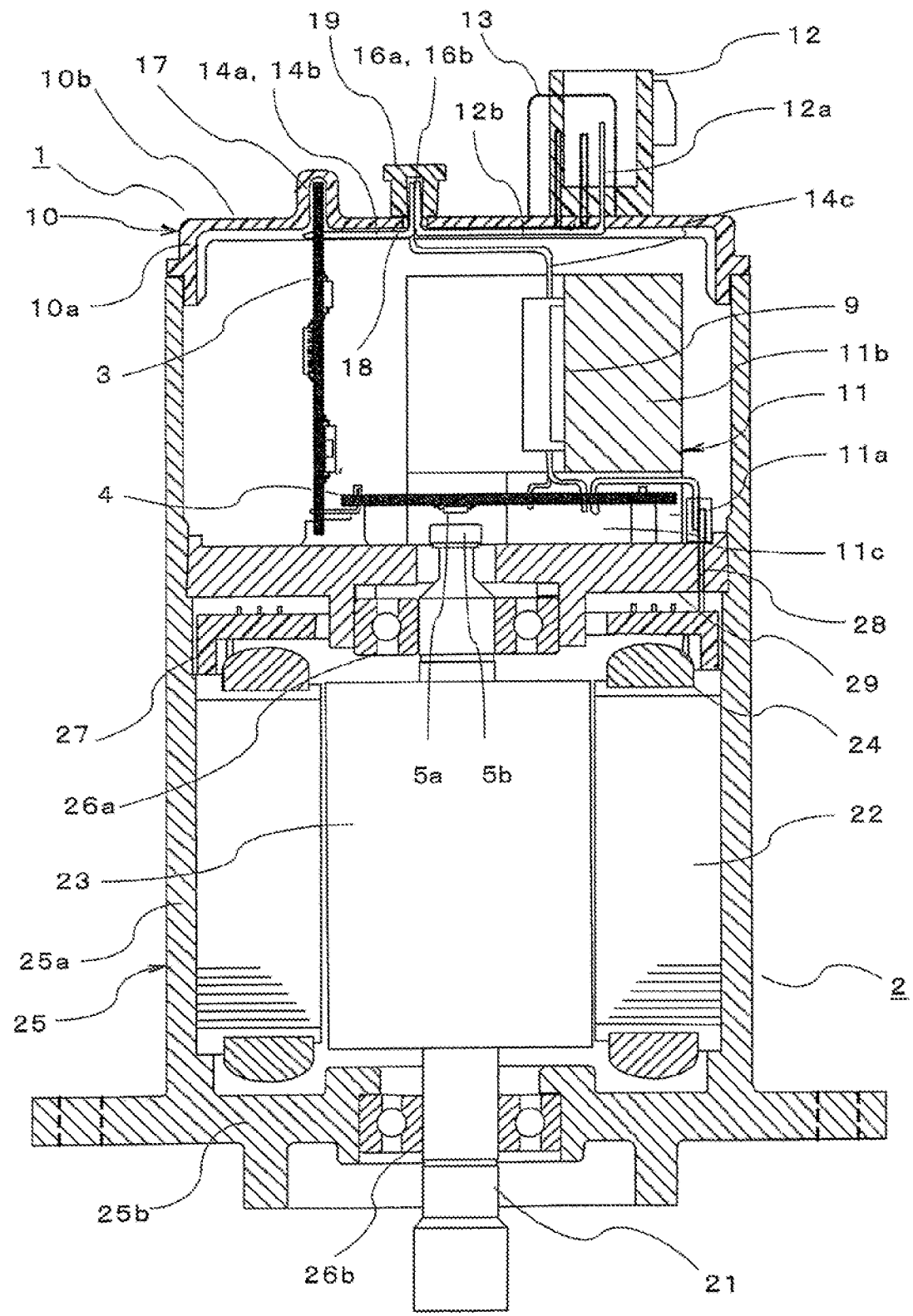
FIG. 2 is a sectional view of the electric power steering device according to the first embodiment of the present invention.
Figure 3:
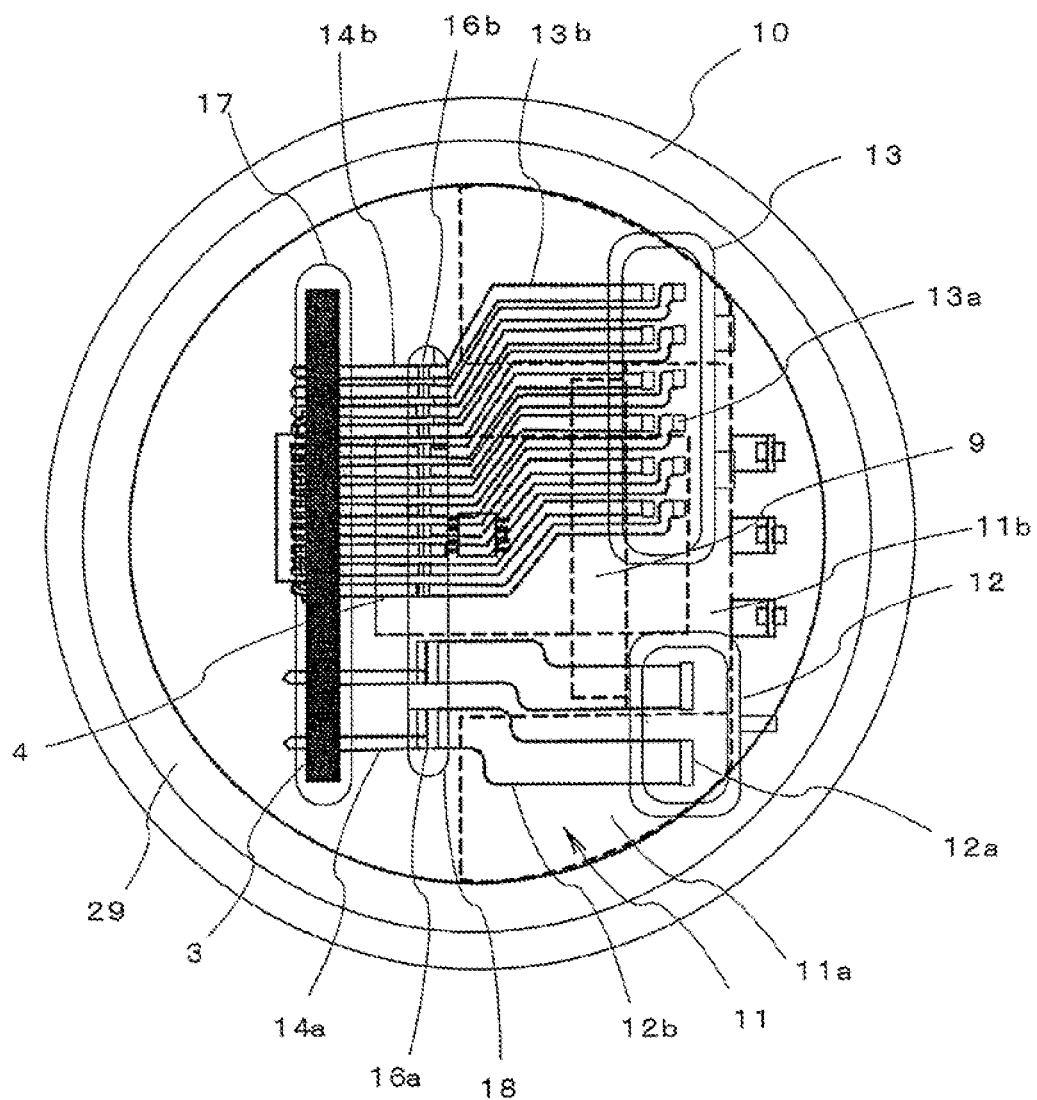
FIG. 3 is a perspective view of the electric power steering device according to the first embodiment of the present invention as viewed from a non-output side.

FIG. 1 is a circuit diagram for illustrating an electric power steering device according to a first embodiment of the present invention. FIG. 2 is a sectional view of the electric power steering device according to the first embodiment of the present invention. FIG. 3 is a perspective view of the electric power steering device according to the first embodiment of the present invention, as viewed from a non-output side.

In FIG. 1 and FIG. 2, the electric power steering device includes a control unit 1 and a motor 2. The control unit 1 is provided on one side of the motor 2 in an axial direction of an output shaft 21 thereof so that the control unit 1 and the motor 2 are arranged side by side in a row and integrated with each other. The control unit 1 includes, for example, a control board 3 on which a CPU 30, various circuits, and other components are mounted, an inverter circuit 6 and a power supply relay 65 configured to supply current to motor windings 24 of the motor 2, and a filter 36. Further, the electric power steering device receives electric power from an in-vehicle battery 34 and an ignition switch 35, and receives various types of information from a sensor 8. Further, the electric power steering device is arranged with the axial direction of the output shaft 21 of the motor 2 being set as a vertical direction, and with the control unit 1 being placed in an upper position. The motor 2 outputs power from a lower end portion of the output shaft 21 to, for example, a speed reducer (not shown). Specifically, in FIG. 2, a lower end side of the output shaft 21 corresponds to an output side, and an upper end side of the output shaft 21 corresponds to a non-output side.

First, a circuit configuration of the control unit 1 is described.

Electric power is supplied from the in-vehicle battery 34 to the control unit 1 via an ignition switch 35. The CPU 30 receives information transmitted from the sensor 8 such as a vehicle speed sensor for detecting a travel speed of a vehicle, and a torque sensor for detecting a steering torque mounted near a steering wheel. The CPU 30 is configured to calculate a current value as a control amount for rotating the motor 2 based on the information described above, and then output the calculated value. A driving circuit 31 is configured to output, in response to an output signal from the CPU 30, a drive signal for driving each switching element of the inverter circuit 6 to the inverter circuit 6.

Only small current flows through the driving circuit 31, and thus the driving circuit 31, which is illustrated as being mounted on the control board 3, can be provided in the inverter circuit 6 instead. Further, the filter 36 including a capacitor and a coil is inserted to a power supply system (+B, ground) so as to suppress noise emission caused by PWM driving of the inverter circuit 6.

The inverter circuit 6 includes three circuit units 6U, 6V, and 6W corresponding to different phases of the motor windings 24. The three circuit units 6U, 6V, and 6W have the same configuration, and hence a description is given only of the circuit unit 6U. The circuit unit 6U includes an upper-arm switching element 61U, a lower-arm switching element 62U, and a relay switching element 64U having a relay function for opening/closing between the U1-phase winding and a node between the upper-arm switching element 61U and the lower-arm switching element 62U. The upper-arm switching element 61U and the lower-arm switching element 62U are PWM-driven in response to a command from the CPU 30. To that end, a smoothing capacitor 7U is connected in parallel to the upper-arm switching element 61U and the lower-arm switching element 62U so as to reduce noise. Further, a shunt resistor 63U is connected in series to the upper-arm switching element 61U and the lower-arm switching element 62U so as to detect current flowing through the motor 2.

The circuit units 6U, 6V, and 6W have the same circuit configuration for windings of a U phase, a V phase, and a W phase, and can independently supply current to a corresponding winding.

Further, a potential difference between both ends of the shunt resistor 63 and voltage of each motor wiring terminal, for example, are also input to an input circuit 32. The CPU 30 receives such information as well, and serves to calculate a difference from a detection value corresponding to the calculated current value, and perform so-called feedback control, to thereby supply desired motor current and assist a steering force. Further, drive signals for switching elements of the power supply relay 65 are output via the driving circuit 31. Here, the power supply relay 65 operates as a relay for connection or disconnection between the battery+B and the inverter circuit 6. In the switching elements of the power supply relay 65, large current flows and accordingly heat is generated. To address this, those switching elements may be incorporated into the inverter circuit 6 to form a power module.

The CPU 30 has an abnormality detection function for detecting an abnormality in the driving circuit 31, the inverter circuit 6, the motor windings 24, and other components in addition to the sensor 8 based on various types of information thus received. When any abnormality has been detected, the CPU 30 turns off the switching elements of upper and lower arms corresponding to a phase in which the abnormality has been detected, and turns off the relay switching elements in accordance with the abnormality so as to interrupt current supply to the abnormal phase alone, for example. Alternatively, the CPU 30 can turn off the switching elements of the power supply relay 65 so as to shut off the power supply from the battery 34.

The motor 2 is a brushless motor including the motor windings 24 including the one set of three-phase motor windings 24, which are Y-connected. A rotation sensor 5a is mounted for the brushless motor, so as to detect a rotational position of a rotor 23. Rotation information such as a rotation angle or a rotation speed of the rotor 23 detected by the rotation sensor 5a is input to the input circuit 32 of the control board 3.

It should be noted that the three-phase motor is adopted as the motor, but a multi-phase motor having four or more phases may be adopted. Further, the three-phase windings are Y-connected to form the motor windings, but may be delta-connected to form the motor windings. Further, the motor windings may be distributed or concentrated ones.

Next, the configuration of the motor 2 is described with reference to FIG. 2.

The motor 2 mainly includes the output shaft 21, the rotor 23, a stator 22, and a motor case 25 having those components incorporated therein.

The motor case 25 has a bottomed cylindrical shape defined by a cylindrical portion 25a and a bottom portion 25b that closes an output side opening of the cylindrical portion 25a. The motor case 25 is made of metal. It is desired that the motor case 25 be made of aluminum in consideration of heat radiating property and an outer shape. A frame 29 is made of metal and has a disk shape. The frame 29 is inserted and held, for example, by press-fitting or shrink-fitting, in the cylindrical portion 25a at substantially a center position thereof in the axial direction. The frame 29 serves as a cover of the motor 2. The motor 2 is separated and independent from the control unit 1 by the frame 29.

The stator 22 is inserted and held, for example, by press-fitting or shrink-fitting, in the cylindrical portion 25a of the motor case 25 to be located on the output side in the cylindrical portion 25a. The stator 22 includes the three-phase motor windings 24. An annular wiring portion 27 is provided at an output side portion of the frame 29 and near the motor windings 24. Terminal ends of the motor windings 24 are connected to the annular wiring portion 27. Three phase terminals 28, through which three phase currents for driving the motor 2 flow, are led out of the annular wiring portion 27 toward the non-output side through the frame 29. That is, the three phase terminals 28 connected to windings of different phases out of the motor windings 24 are led out of the frame 29 to the non-output side.

The rotor 23 is fixed to the output shaft 21 so as to be rotatable in the motor case 25. The output shaft 21 is supported by a bearing 26a provided at an axial center of the frame 29, and a bearing 26b provided at an axial center of the bottom portion 25b. The rotor 23 is coaxially provided in the stator 22. A sensor rotor 5b is provided at an end of the output shaft 21 protruding from the frame 29. Although not illustrated, a plurality of permanent magnets are arranged on an outer peripheral surface of the rotor 23 at regular pitches with N pole and S pole alternately arranged in a circumferential direction.

With reference to FIG. 2 and FIG. 3, the configuration of the control unit 1 is described next.

The control unit 1 adopts a vertical arrangement for main components; the components are arranged in parallel to the output shaft 21. With this structure, an area of the control unit 1 in the radial direction as a direction orthogonal to the output shaft 21 can be equivalent to or smaller than that of the motor 2.

A housing 10 is made of a resin, and has a bottomed cylindrical shape defined by a cylindrical peripheral wall 10a and a bottom portion 10b that closes an opening of the peripheral wall 10a on one side. The housing 10 is fitted, at the peripheral wall 10a thereof, into the opening of the cylindrical portion 25a of the motor case 25 with its opening facing the motor 2 side, and thus is mounted to the cylindrical portion 25a with screws (not shown). The housing 10 and a non-output side portion of the cylindrical portion 25a of the motor case 25 form an outer case of the control unit 1. The components of the control unit 1 are accommodated in the outer case. In this example, the housing 10 forms the control unit together with the non-output side portion of the cylindrical portion 25a. However, the outer case of the control unit 1 can be formed of the housing 10 alone by reducing an axial length of the cylindrical portion 25a, and increasing an axial length of the peripheral wall 10a.

A region other than a projection 17 and a hole 18 of an outer wall surface as a non-output side surface of the bottom portion 10b has a flat surface orthogonal to the axial direction of the output shaft 21. The projection 17 is formed away from an axial center of the output shaft 21. Further, the projection 17 is formed by protruding the bottom portion 10b to the non-output side, to thereby form a linear board accommodating portion that opens to the output side. The hole 18 is an elongated one formed on a radially inner side of the projection 17 of the bottom portion 10b so as to be parallel to the projection 17.

The outer wall surface of the bottom portion 10b of the housing 10 has mounted thereon a power supply connector 12 to be connected to the battery 34 as an external power supply, and a signal connector 13 to be connected to the sensor 8. In FIG. 3, one power supply connector 12 and one signal connector 13 are mounted on the bottom portion 10b, but the numbers of power supply connectors 12 and signal connectors 13 are not limited to one. The power supply connector 12 and the signal connector 13 are formed such that contact pins 12a and 13a thereof extend in parallel to the axial direction of the output shaft 21. The contact pin 12a passes through the bottom portion 10b, extends as an extension terminal 12b on an inner wall surface as an output side surface of the bottom portion 10b up to the hole 18, and protrudes outward through the hole 18. The contact pin 13a passes through the bottom portion 10b, extends as an extension terminal 13b on the inner wall surface as the output side surface of the bottom portion 10b up to the hole 18, and protrudes outward through the hole 18.

Although not illustrated, the filter 36 is provided on the outer wall surface of the bottom portion 10b. Wirings of the extension terminals 12b and 13b, and the filter 36, for example, are formed integrally with the resin-made housing 10 by insert molding or outsert molding. The power supply connector 12 and the signal connector 13 may be also formed integrally with the housing 10. Further, the filter 36 may be provided in an empty space of the housing 10.

The housing 10 has provided therein, for example, a heat sink 11, the control board 3, power modules 9 having incorporated therein a plurality of switching elements as components of the inverter circuit 6. Although not illustrated, the smoothing capacitor 7 is provided in the empty space of the housing 10.

As illustrated in FIG. 3, the heat sink 11 is made of a material having high heat conductivity such as aluminum or copper, and includes a flat plate-like base portion 11a and a rectangular column portion 11b formed upright on the base portion 11a. The base portion 11a of the heat sink 11 is mounted in contact with a region other than a protruding portion of the output shaft 21, of a non-output side surface of the frame 29. The column portion 11b is provided away from the axial extension of the output shaft 21 in the radial direction, so as to be parallel to the axial direction of the output shaft 21.

The base portion 11a has a recess 11c. The non-output side end portion of the output shaft 21 is inserted to the recess 11c. The rotation sensor substrate 4 is mounted to the frame 29 to extend orthogonally to the axial direction of the output shaft 21, while being partially inserted to the recess 11c. The rotation sensor substrate 4 has formed thereon signal lines, feeding lines, and other lines. Further, on the rotation sensor substrate 4, the rotation sensor 5a is mounted opposite to the sensor rotor 5b mounted to the non-output side end portion of the output shaft 21. The phase terminals 28 led out of the frame 29 to the non-output side are connected to the feeding lines on the rotation sensor substrate 4.

On the control board 3, the CPU 30, the driving circuit 31, the input circuit 32, the power supply circuit 33, and other components are mounted. Further, the control board 3 is formed into a flat rectangular plate, and provided in parallel to the axial direction of the output shaft 21 with its lower end being fixed onto the non-output side surface of the frame 29 and its upper end being inserted into the board accommodating portion of the projection 17. Further, the control board 3 is provided opposite to the column portion 11b across the axial center of the output shaft 21. The signal lines of the rotation sensor substrate 4 are connected to a connection portion formed at a lower side of the control board 3. Relay terminals 14a and 14b are connected to a connection portion formed at an upper side of the control board 3, extend along the inner wall surface of the bottom portion 10b up to the hole 18, and protrude outward through the hole 18.

The power module 9 is obtained by sealing with a resin the switching elements as components of the inverter circuit 6, which are being mounted on wirings made from a copper plate, for example. The power module 9 is fixed to an opposite surface to the control board 3 of the column portion 11b with screws, for example. With this structure, the power module 9 is provided in parallel to the axial direction of the output shaft 21. Heat generated in the power module 9 is transferred to the motor case 25 via the frame 29, and released from the motor case 25. A relay terminal 14c led out of an upper portion of the power module 9 extends along the inner wall surface of the bottom portion 10b up to the hole 18, and protrudes outward through the hole 18. The signal terminals and the feeding terminals led out of the lower portion of the power module 9 are connected to the rotation sensor substrate 4. With this structure, current from the power module 9 is supplied to the motor windings 24 via the feeding lines of the rotation sensor substrate 4 and the phase terminals 28.

Next, the arrangement and wiring structure of the control board 3, the power supply connector 12, the signal connector 13, and the power module 9 are described.

The power supply connector 12 and the signal connector 13 are provided in a row so as to face the projection 17 across the axial center of the output shaft 21, with the contact pins 12a and 13a being arranged in parallel in the length direction of the projection 17. The hole 18 is formed between the projection 17, and the power supply connector 12 and the signal connector 13 with the direction thereof being set parallel to the length direction of the projection 17. With this arrangement, the projection 17, the hole 18, and the aligned power supply connector 12 and signal connector 13 are arranged, in parallel to one another, in this order in a direction orthogonal to the length direction of the projection 17.

A protruding portion of the extension terminal 12b through the hole 18 is connected to a protruding portion of each of the relay terminals 14a and 14c through the hole 18. With this connection, the contact pin 12a of the power supply connector 12 is connected to the power supply lines of the control board 3 and the power module 9 via the extension terminal 12b, and the relay terminals 14a and 14c. In this state, external electric power is supplied to the control board 3 and the power module 9.

Meanwhile, a protruding portion of the extension terminal 13b from the hole 18 is connected to a protruding portion of each of the relay terminals 14b from the hole 18. With this connection, the contact pin 13a of the signal connector 13 is connected to the signal lines of the control board 3 via the extension terminal 13b, and the relay terminals 14b. In this state, information such as torque or a vehicle speed is input to the control board 3.

The signal lines of the control board 3 and the signal lines of the power module 9 are connected to one another via the signal lines of the rotation sensor substrate 4. With this connection, a drive signal for driving each switching element is input to the power module 9.

A connection portion 16a between the extension terminal 12b, and the relay terminals 14a and 14c and a connection portion 16b between the extension terminal 13b and the relay terminal 14b are provided in the hole 18 in a row along the direction of the hole 18.

Further, a cover 19 is mounted to the hole 18 from the non-output side so as to prevent intrusion of water, foreign matters, and other materials from the outside via the hole 18.

Effects attained by the thus-configured device are described.

The column portion 11b of the heat sink 11, the power module 9, and the control board 3 are provided in parallel to the axial direction of the output shaft 21, and hence the product can be downsized, particularly in the radial direction.

Further, the projection 17, in which the upper end of the control board 3 is to be inserted, is formed by protruding the bottom portion 10b of the housing 10 to the non-output side. The power supply connector 12 and the signal connector 13 are provided in a region other than the projection 17 of the outer wall surface of the bottom portion 10b. With this structure, the projection 17 is located closer to the non-output side in the axial direction of the output shaft 21 than the region of the bottom portion 10b in which the power supply connector 12 and the signal connector 13 are provided. Therefore, the region other than the projection 17 of the bottom portion 10b can be lowered to the output side by the protruding height of the projection. It is accordingly possible to secure a mountable area of the control board 3 and also to downsize the product in the axial direction.

The power supply connector 12 and the signal connector 13 are provided on the outer wall surface of the bottom portion 10b so as to face the projection 17 across the output shaft 21 as viewed from the non-output side. With this arrangement, it is possible to secure a large mountable area for components of the control board 3. Further, the power supply connector 12, the signal connector 13, the projection 17, and other components can be provided in a distributed manner on the outer wall surface of the bottom portion 10b.

The hole 18 is formed so as to pass through the bottom portion 10b. The extension terminal 12b of the power supply connector 12, the extension terminal 13b of the signal connector 13, the relay terminals 14a and 14b led out of the control board 3, and the relay terminal 14c led out of the power module 9, are led out through the hole 18, and connected to one another. With this structure, after the housing 10 is mounted to the motor case 25, the control unit 3 and other main components of the control unit 1 are electrically connected to the power supply connector 12 and the signal connector 13 to thereby enable easier assembly.

The hole 18 extends linearly. The connection portion 16a between the extension terminal 12b, and the relay terminals 14a and 14c and the connection portion 16b between the extension terminal 13b and the relay terminal 14b are arranged substantially in a straight line inside the hole 18. This improves operability for wire connection.

In the first embodiment described above, the projection 17, and the power supply connector 12 and the signal connector 13 are provided opposite to each other across the hole 18 and in parallel to each other. However, it should be noted that the power supply connector 12 and the signal connector 13 are only required to be provided in a region other than the projection 17 of the outer wall surface of the bottom portion 10b. For example, the power supply connector 12 and the signal connector 13 may be provided away from each other in the length direction of the projection 17, and orthogonally to the projection 17. In this case, the extension terminals extending from the contact pins of the power supply connector 12 and the signal connector 13 are bent and led out through the hole 18.

Further, in the first embodiment described above, the power supply connector 12 and the signal connector 13 are formed as different connectors, but similar effects can be achieved by a hybrid connector in which the power supply connector 12 and the signal connector 13 are integrated with each other.

Second Embodiment

Figure 4:
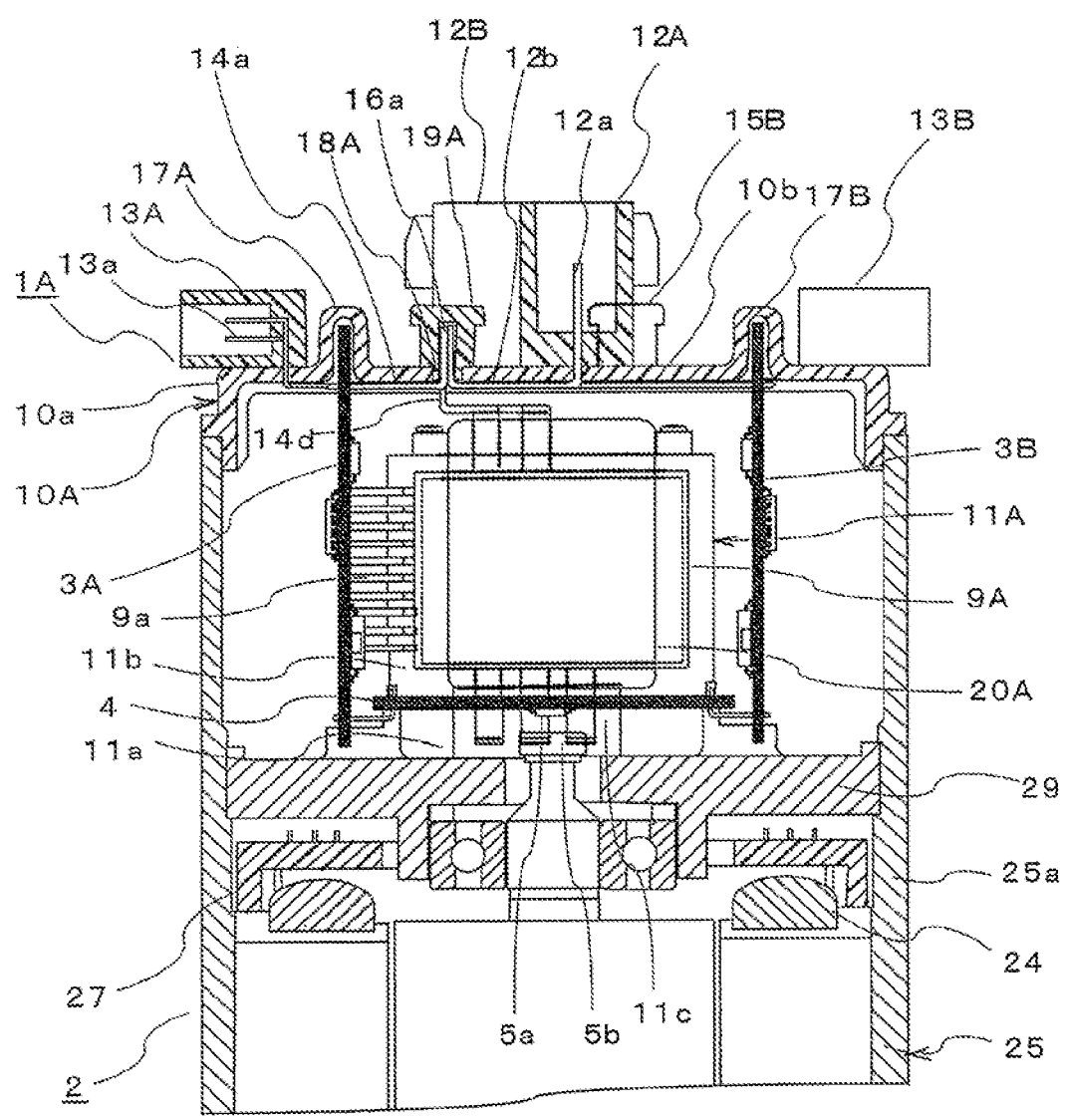
FIG. 4 is a sectional view of a main part of an electric power steering device according to a second embodiment of the present invention.

FIG. 4 is a sectional view of a main part of an electric power steering device according to a second embodiment of the present invention. In the first embodiment, the description is given only of the case in which the inverter circuit 6 for driving the motor 2 is the circuit of only one system. In the second embodiment, however, a description is given of a case of inverter circuits 6 of two systems. Further, in the second embodiment, equivalent components to those of the first embodiment are denoted by identical reference symbols.

In the circuit diagram of FIG. 1, there are provided one set of motor windings 24 obtained by star-connecting U-phase, V-phase, and W-phase windings, the power supply relay 65 and inverter circuit 6 of one system, which are configured to supply electric power to the one set of motor windings 24, and one driving circuit 31 configured to drive the inverter circuit 6. In the second embodiment, although not illustrated, there are provided two sets of motor windings 24 each obtained by star-connecting U-phase, V-phase, and W-phase windings, power supply relays 65 and inverter circuits 6 of two systems, which are configured to supply electric power to a corresponding one of the two sets of motor windings 24, and two driving circuits 31 configured to drive a corresponding one of the inverter circuits 6 of two systems.

In FIG. 4, a control unit 1A includes a first control unit portion, a second control unit portion, the rotation sensor substrate 4, and a housing 10A. The first control unit portion includes a first control board 3A, a first heat sink 11A, a first power module 9A, a first relay member 20A, a first power supply connector 12A, a first signal connector 13A, and other components. The second control unit portion includes a second control board 3B, a second heat sink (not shown), a second power module (not shown), a second relay member (not shown), a second power supply connector 12B, a second signal connector 13B, and other components. The rotation sensor substrate 4 has the rotation sensor 5a mounted thereon. Similar components of the first control unit portion and the second control unit portion are configured in the same manner.

The first heat sink 11A is mounted with the base portion 11a being fixed to the frame 29 and the column portion 11b being provided in parallel to the axial direction of the output shaft 21. Although not illustrated, the second heat sink is mounted with the base portion 11a being fixed to the frame 29 and the column portion 11b being provided in parallel to the axial direction of the output shaft 21. The first heat sink 11A and the second heat sink are provided opposite to each other across the axial center of the output shaft 21.

The first control board 3A and the second control board 3B are each provided in parallel to the axial direction of the output shaft 21 with their lower ends being fixed to the frame 29. The first control board 3A and the second control board 3B are provided opposite to each other across the first heat sink 11A and the second heat sink, in a direction orthogonal to a direction in which the first heat sink 11A and the second heat sink face each other.

The first power module 9A is mounted to a surface of the column portion 11b of the first heat sink 11A, which faces the radially outer side, and located in parallel to the axial direction of the output shaft 21. Signal terminals 9a led out of the first power module 9A are connected to the first control board 3A. Although not illustrated, the second power module is mounted to a surface of the column portion of the second heat sink, which faces the radially outer side, and located in parallel to the axial direction of the output shaft 21. Signal terminals led out of the second power module are connected to the second control board 3B.

The rotation sensor substrate 4 is provided opposite to the non-output side end portion of the output shaft 21 and orthogonally to the axial direction of the output shaft 21. The rotation sensor 5a is provided on the rotation sensor substrate 4 so as to face the sensor rotor 5b. Signal lines of the rotation sensor substrate 4 are connected to the first control board 3A and the second control board 3B.

The first relay member 20A is a resin molded body of a rectangular column shape, in which a bus bar is insert-molded. The first relay member 20A is provided on the radially outer side of the first power module 9A as to be parallel to the first power module 9A. Although not illustrated, the second relay member is provided on the radially outer side of the second power module so as to be parallel to the second power module.

The housing 10A includes the cylindrical peripheral wall 10a and the bottom portion 10b. A first projection 17A is formed by protruding the bottom portion 10b outward so as to allow insertion of the first control board 3A at its upper end side. A second projection 17B is formed by protruding the bottom portion 10b outward so as to allow insertion of the second control board 3B at its upper end side. A first hole 18A is formed in the bottom portion 10b on the second projection 17B side of the first projection 17A so as to be parallel to the first projection 17A. Although not illustrated, the second hole is formed in the bottom portion 10b on the first projection 17A side of the second projection 17B so as to be parallel to the second projection 17B. A first cover 19A and a second cover portion 19B are mounted to the first hole 17A and the second hole so as to close the first hole 17A and the second hole.

The first power supply connector 12A is provided on the outer wall surface of the bottom portion 10b on the non-output side with respect to the first power module 9A, with the contact pin 12a being in parallel to the axial direction of the output shaft 21. With this structure, the first projection 17A, the first hole 18A, and the first power supply connector 12A are arranged in parallel to one another in this order in the direction orthogonal to the length direction of the first projection 17A. The contact pin 12a of the first power supply connector 12A passes through the bottom portion 10b, extends as the extension terminal 12b on the inner wall surface of the bottom portion 10b up to the first hole 18A, and protrudes outward through the first hole 18A.

The second power supply connector 12B is provided on the outer wall surface of the bottom portion 10b on the non-output side with respect to the second power module, with the contact pin 12*a* being in parallel to the axial direction of the output shaft 21. With this structure, the second projection 17B, the second hole, and the second power supply connector 12B are arranged in parallel to one another in this order in the direction orthogonal to the length direction of the second projection 17B. The contact pin 12*a* of the second power supply connector 12B passes through the bottom portion 10*b*, extends as the extension terminal 12*b* on the inner wall surface of the bottom portion 10*b* up to the second hole, and protrudes outward through the second hole.

The relay terminal 14*a* connected to a connection portion formed at an upper side of the first control board 3A extends along the inner wall surface of the bottom portion 10*b* up to the hole 18, and protrudes outward through the first hole 18A. A relay terminal 14*d* connected to the bus bar of the first relay member 20A extends along the inner wall surface of the bottom portion 10*b* up to the first hole 18A, and protrudes outward through the hole 18. Although not illustrated, the relay terminal 14*a* connected to a connection portion formed at an upper side of the second control board 3B extends along the inner wall surface of the bottom portion 10*b* up to the second hole, and protrudes outward through the second hole. A relay terminal 14*d* connected to the bus bar of the second relay member extends along the inner wall surface of the bottom portion 10*b* up to the second hole, and protrudes outward through the second hole.

Protruding ends of the extension terminals 12*b* and the relay terminals 14*a* and 14*d* from the first hole 18A are connected to one another. With this connection, the contact pin 12*a* of the first power supply connector 12A is connected to the power supply lines of the first control board 3A and the first power module 9A via the extension terminal 12*b*, and the relay terminals 14*a* and 14*d*. In this state, external electric power is supplied to the first control board 3A and the first power module 9A.

Although not illustrated, protruding ends of the extension terminals 12*b* and the relay terminals 14*a* and 14*d* from the second hole are connected to one another. With this connection, the contact pin 12*a* of the second power supply connector 12B is connected to the power supply lines of the second control board 3B and the second power module via the extension terminal 12*b*, and the relay terminals 14*a* and 14*d*. In this state, external electric power is supplied to the second control board 3B and the second power module.

The first signal connector 13A is provided on the radially outer side of the first projection 17A on the outer wall surface of the bottom portion 10*b* with the contact pin 13*a* being orthogonal to the axial direction of the output shaft 21. The contact pin 13*a* of the first signal connector 13A passes through the bottom portion 10*b*, extends on the inner wall surface of the bottom portion 10*b* up to the first control board 3A, and is then connected to the connection portion formed at the upper side of the first control board 3A. With this structure, the contact pin 13*a* of the first signal connector 13A is directly connected to the signal line of the first control board 3A. In this state, information such as torque or a vehicle speed is input to the first control board 3A.

The second signal connector 13B is provided on the radially outer side of the second projection 17B on the outer wall surface of the bottom portion 10*b* with the contact pin 13*a* being orthogonal to the axial direction of the output shaft 21. The contact pin 13*a* of the second signal connector 13B passes through the bottom portion 10*b*, extends on the inner wall surface of the bottom portion 10*b* up to the second control board 3B, and is then connected to the connection portion formed at the upper side of the second control board 3B. With this structure, the contact pin 13*a* of the second signal connector 13B is directly connected to the signal line of the second control board 3B. In this state, information such as torque or a vehicle speed is input to the second control board 3B.

In the second embodiment, the column portion 11*b* of each of the first heat sink 11A and the second heat sink, the first power module 9A, the second power module, the first control board 3A, and the second control board 3B are provided in parallel to the axial direction of the output shaft 21. Further, the first projection 17A, in which an upper portion of the first control board 3A is to be inserted, and the second projection 17B, in which an upper portion of the second control board 3B is to be inserted, are formed by protruding the bottom portion 10*b* of the housing 10 to the non-output side. Further, the first power supply connector 12A, the second power supply connector 12B, the first signal connector 13A, and the second signal connector 13B are provided in a region other than the first projection 17A and the second projection 17B, of the outer wall surface of the bottom portion 10*b*. Thus, in the second embodiment as well, it is possible to secure the mountable area of the first control board 3A and the second control board 3B and also to downsize the product in the axial direction as in the first embodiment. With this, even when the number of components to be mounted is increased, it is possible to prevent the device from being increased in axial dimension without increasing a radial size thereof. Consequently, the device can be downsized even with the configuration including the inverter circuits 6 of two systems for redundancy.

The first power supply connector 12A and the second power supply connector 12B are provided between the first control board 3A and the second control board 3B as viewed from the non-output side of the output shaft 21 in the axial direction. The first hole 18A is formed between the first projection 17A and the first power supply connector 12A as viewed from the non-output side of the output shaft 21 in the axial direction. Although not illustrated, the second hole is formed between the second projection 17B and the second power supply connector 12B as viewed from the non-output side of the output shaft 21 in the axial direction. With this arrangement, the extension terminal 12*b* of the contact pin 12*a* can be shortened.

The connection portion 16*a* between the extension terminal 12*b* and the relay terminals 14*a* and 14*d* are arranged substantially in a straight line inside the first hole 18A and the second hole. This improves operability for wire connection.

The first signal connector 13A is provided on the radially outer side of the first projection 17A on the outer wall surface of the bottom portion 10*b*. Likewise, the second signal connector 13B is provided on the radially outer side of the second projection 17B on the outer wall surface of the bottom portion 10*b*. The contact pins 13*a* are led out into the housing 10, and directly connected to the first control board 3A and the second control board 3B. With this, no relay terminal is required to be led out of the first control board 3A and the second control board 3B, and hence the number of components can be reduced.

In the second embodiment described above, the first signal connector 13A and the second signal connector 13B are formed on the bottom portion 10*b* such that each contact pin 13*a* extends orthogonally to the axial direction of the output shaft 21. However, it should be noted that the first signal connector 13A and the second signal connector 13B may be formed on the bottom portion 10*b* such that each contact pin 13*a* extends in parallel to the axial direction of the output shaft 21.

Further, in the second embodiment described above, the contact pins 13*a* of the first signal connector 13A and the second signal connector 13B are directly connected to the first control board 3A and the second control board 3B. However, the contact pins 13a of the first signal connector 13A and the second signal connector 13B may extend up to the first hole 18A and the second hole via the extension terminals 13b so as to be connected, in the first hole 18A and the second hole, to the relay terminals 14b extending from the first control board 3A and the second control board 3B up to the first hole 18A and the second hole.

Further, in the second embodiment described above, the first hole 18A and the second hole are formed in the bottom portion 10b. However, one hole may be formed in the bottom portion 10b, and the extension terminals 12b of the contact pins 12a of the first power supply connector 12A and the second power supply connector 12B may be protruded through the one hole.

Further, in the second embodiment described above, the first signal connector 13A and the second signal connector 13B are provided outside of the first projection 17A and the second projection 17B, respectively. However, the first signal connector 13A and the second signal connector 13B may be provided between the first projection 17A and the second projection 17B, together with the first power supply connector 12A and the second power supply connector 12B.

Further, in the second embodiment described above, the first power supply connector 12A and the second power supply connector 12B are provided between the first projection 17A and the second projection 17B. However, the first power supply connector 12A and the second power supply connector 12B may be provided outside the first projection 17A and the second projection 17B, together with the first signal connector 13A and the second signal connector 13B, respectively.

In the embodiments described above, the power module is mounted to the column portion of the heat sink so as to be parallel to the axial direction of the output shaft. However, it should be noted that the power module is not necessarily required to be mounted in parallel to the axial direction of the output shaft. For example, when the column portion of the heat sink has a mounting surface inclined with respect to the axial direction of the output shaft, the power module mounted to the mounting surface is also inclined with respect to the axial direction of the output shaft.

REFERENCE SIGNS LIST 1, 1A control unit, 2 motor, 3 control board, 3A first control board, 3B second control board, 9 power module, 9A first power module, 10, 10A housing, 10b bottom portion, 11 heat sink, 11A first heat sink, 12 power supply connector, 12A first power supply connector, 12B second power supply connector, 13 signal connector, 13A first signal connector, 13B second signal connector, 12a, 13a contact pin, 12b, 13b extension terminal, 14a, 14b, 14c, 14d relay terminal, 16a, 16b connection portion, 17 projection, 17A first projection, 17B second projection, 18 hole, 18A first hole, 19 cover, 21 output shaft, 24 motor windings, 61U upper-arm switching element, 62U lower-arm switching element, 64U relay switching element

The invention claimed is:

1. An electric power steering device, comprising:
a motor; and
a control unit provided on a non-output side in an axial direction of an output shaft of the motor to be integrated with the motor,
the control unit including:
a power module including a plurality of switching elements configured to supply current to motor windings of the motor;
a control board configured to output a control signal to each of the plurality of switching elements;
a heat sink, to which the power module is mounted, and is configured to release heat generated in the plurality of switching elements;
a housing forming an outer case of the control unit;
a power supply connector; and
a signal connector,
wherein the control board is provided in parallel to the axial direction of the output shaft,
wherein a projection is formed at a bottom portion on the non-output side of the housing so as to protrude to the non-output side,
wherein a non-output side end portion of the control board is inserted into the projection,
wherein the power supply connector and the signal connector are provided in a region of an outer wall surface of the bottom portion spaced from the projection,
wherein a hole is formed to pass through the bottom portion, and
wherein an extension terminal extending from a contact pin of at least one connector out of the power supply connector and the signal connector, and each of a plurality of relay terminals to be connected to the extension terminal, which extend from the control board and the power module, are led out to the non-output side through the hole and connected to each other.

2. The electric power steering device according to claim 1, wherein the projection, the hole, and the at least one connector are each formed linearly, and arranged in this order in parallel to one another in a direction orthogonal to a length direction of the projection.

3. The electric power steering device according to claim 2, wherein the hole is formed linearly, and connection portions between the extension terminals and the relay terminals are arranged in a row in the hole.

4. The electric power steering device according to claim 3, further comprising a cover configured to close the hole.

5. The electric power steering device according to claim 2, further comprising a cover configured to close the hole.

6. The electric power steering device according to claim 1, wherein the hole is formed linearly, and connection portions between the extension terminals and the relay terminals are arranged in a row in the hole.

7. The electric power steering device according to claim 6, further comprising a cover configured to close the hole.

8. The electric power steering device according to claim 1, further comprising a cover configured to close the hole.

9. The electric power steering device according to claim 1,
wherein at least one connector out of the power supply connector and the signal connector is provided on a radially outer side of the projection at the outer wall surface of the bottom portion, and
wherein an extension terminal extending from a contact pin of the at least one connector is directly connected to the control board.

* * * * *